United States Patent
Ramani et al.

(10) Patent No.: US 11,710,218 B2
(45) Date of Patent: Jul. 25, 2023

(54) SYSTEM AND METHOD FOR NORMALIZING DYNAMIC RANGE OF DATA ACQUIRED UTILIZING MEDICAL IMAGING

(71) Applicant: GE PRECISION HEALTHCARE LLC, Wauwatosa, WI (US)

(72) Inventors: Sathish Ramani, Niskayuna, NY (US); Lin Fu, Niskayuna, NY (US); James Vradenburg Miller, Clifton Park, NY (US); Bruno Kristiaan Bernard De Man, Clifton Park, NY (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 195 days.

(21) Appl. No.: 17/204,074

(22) Filed: Mar. 17, 2021

(65) Prior Publication Data
US 2022/0301109 A1 Sep. 22, 2022

(51) Int. Cl.
*G06T 5/00* (2006.01)
*G06T 11/00* (2006.01)

(52) U.S. Cl.
CPC .......... *G06T 5/002* (2013.01); *G06T 11/006* (2013.01); *G06T 2207/10081* (2013.01);
(Continued)

(58) Field of Classification Search
CPC ............. G06T 5/002; G06T 11/006; G06T 2207/10081; G06T 2207/10116; G06T 2207/20081; G06T 2207/20084; G06T 7/0014; G06T 11/003; G06T 11/005; G06T 11/008; G06T 2200/04; G06T 2210/41; G06T 2211/404; G06T 2211/408; G06T 2211/421; G06T 2207/10064–10136; G06T 2207/30004; G06T 3/4046; G06T 9/002; A61B 6/032; A61B 6/037; A61B 6/4208; A61B 6/466; A61B 6/482; A61B 6/5205; A61B 6/5211; A61B 6/5235; A61B 6/5258; G06N 3/02; G06N 3/08–088;
(Continued)

(56) References Cited

U.S. PATENT DOCUMENTS

| | | | |
|---|---|---|---|
| 2008/0304731 A1* | 12/2008 | Kimura | G06T 5/002 382/131 |
| 2013/0051516 A1* | 2/2013 | Yang | G06T 11/005 378/4 |

(Continued)

OTHER PUBLICATIONS

Yang, Qingson, et al.; "Low Dose CT Image Denoising Using a Generative Adversarial Network with Wasserstein Distance and Perceptual Loss", IEEE Trans. Med. Imaging. 37(2018); pp. 1-10.
(Continued)

*Primary Examiner* — Jose L Couso
(74) *Attorney, Agent, or Firm* — Fletcher Yoder P.C.

(57) ABSTRACT

A computer-implemented method for image processing is provided. The method includes obtaining data acquired by a medical imaging system. The method also includes normalizing the data. The method further includes de-noising the normalized data utilizing a deep learning-based denoising network. The method even further includes de-normalizing the de-noised data. The method yet further includes generating blended data based on both the data and the de-normalized de-noised data.

20 Claims, 10 Drawing Sheets

(52) U.S. Cl.
CPC ............... *G06T 2207/10116* (2013.01); *G06T 2207/20081* (2013.01); *G06T 2207/20084* (2013.01)

(58) Field of Classification Search
CPC ...... G06N 3/0445; G06N 3/0454; G06N 7/00; G06N 20/00; G06K 7/1482; G06V 10/454; G06V 10/82; G06V 30/18057; G06V 10/40; G06V 10/42; G06V 10/422; G06V 10/467; Y10S 378/901; H04N 5/32
See application file for complete search history.

(56) References Cited

U.S. PATENT DOCUMENTS

| | | | |
|---|---|---|---|
| 2013/0101190 A1* | 4/2013 | Shi ...................... | G06T 11/006 382/131 |
| 2014/0119628 A1* | 5/2014 | Elad ..................... | G06T 11/006 382/131 |
| 2017/0071562 A1* | 3/2017 | Suzuki .................. | A61B 6/502 |
| 2018/0018757 A1* | 1/2018 | Suzuki .................. | G06T 3/4053 |
| 2018/0270474 A1* | 9/2018 | Liu ....................... | A61B 6/508 |
| 2019/0005686 A1* | 1/2019 | Liu ....................... | G16H 30/40 |
| 2019/0057523 A1* | 2/2019 | Cao ...................... | G06T 11/005 |
| 2019/0221011 A1* | 7/2019 | Ye ........................ | G06T 5/50 |
| 2019/0365341 A1* | 12/2019 | Chan ................... | A61B 6/5258 |
| 2020/0033491 A1* | 1/2020 | Panin ................... | G01T 7/005 |
| 2020/0043204 A1* | 2/2020 | Fu ........................ | G06N 3/0454 |
| 2020/0093453 A1* | 3/2020 | Yu ........................ | A61B 6/032 |
| 2020/0104720 A1* | 4/2020 | Bao ...................... | G06K 9/6256 |
| 2020/0273215 A1* | 8/2020 | Wang ................... | G06N 3/04 |
| 2020/0311490 A1* | 10/2020 | Lee ...................... | G06T 7/0014 |
| 2021/0012463 A1 | 1/2021 | Ramani et al. | |
| 2022/0044452 A1* | 2/2022 | Wang ................... | G06T 11/005 |
| 2022/0096054 A1* | 3/2022 | Vignon ................ | G06T 7/0012 |
| 2022/0309718 A1* | 9/2022 | Panin ................... | G16H 30/40 |
| 2023/0011644 A1* | 1/2023 | Zhao .................... | A61B 6/542 |

OTHER PUBLICATIONS

Wu, Dufan, et al.; "Consensus Neural Network for Medical Imaging Denoising with Only Nosy Training Samples", Medical Image Computing and Computer Assisted Intervention—MICCAI 2019; pp. 1-9.

Xu et al., "Adaptive Smoothing Algorithms for MBIR in CT Applications", Proceedings of SPIE, 15th International Meeting on Fully Three-Dimensional Image Reconstruction in Radiology and Nuclear Medicine, May 28, 2019, 6 pgs. SPIEDigitalLibrary.org/conference-proceedings-of-spie.

Ghani et al., "CNN Based Sinogram Denoising for Low-Dose CT", Jan. 2018, 3pgs.

Li et al., "A Sinogram Inpainting Method based on Generative Adversarial Network for Limited-angle Computed Tomography," 2019, 5 pgs.

Yuan et al., "SIPID: A Deep Learning Framework for Sinogram Interpolation and Image Denoising in Low-Dose CT Reconstruction,", 15th International Symposium on Biomedical Imaging, Apr. 4-7, 2018, Washington, DC, 2018 IEEE, 4 pgs.

\* cited by examiner

SYSTEM AND METHOD FOR NORMALIZING DYNAMIC RANGE OF DATA ACQUIRED UTILIZING MEDICAL IMAGING

BACKGROUND

The subject matter disclosed herein relates to imaging systems and, more particularly, to techniques for processing data (e.g., projection or image data) acquired utilizing medical imaging or other imaging systems that encounter huge dynamic ranges in their measurements.

Non-invasive imaging technologies allow images of the internal structures or features of a subject (patient, manufactured good, baggage, package, or passenger) to be obtained non-invasively. In particular, such non-invasive imaging technologies rely on various physical principles, such as the differential transmission of X-rays through the target volume or the reflection of acoustic waves, to acquire data and to construct images or otherwise represent the internal features of the subject.

For example, in X-ray-based imaging technologies, a subject of interest, such as a human patient, is irradiated with X-ray radiation and the attenuated radiation impacts a detector where the attenuated intensity data is collected. In digital X-ray systems, a detector produces signals representative of the amount or intensity of radiation impacting discrete pixel regions of a detector surface. The signals may then be processed to generate an image that may be displayed for review.

In one such X-ray based technique, known as computed tomography (CT), a scanner may project fan-shaped or cone-shaped X-ray beams from an X-ray source from numerous view-angle positions on an object being imaged, such as a patient. The X-ray beams are attenuated as they traverse the object and are detected by a set of detector elements which produce signals representing the intensity of the attenuated X-ray radiation on the detector. The signals are processed to produce data representing the line integrals of the linear attenuation coefficients of the object along the X-ray paths. These signals are typically called "projection data" or just "projections". By using reconstruction techniques, such as filtered backprojection, images may be generated that represent a volume or a volumetric rendering of a region of interest of the patient or imaged object. In a medical context, pathologies or other structures of interest may then be located or identified from the reconstructed images or rendered volume.

Noise in the sinogram domain of the acquired CT data may result in undesirable artifacts. These artifacts may include streaks and/or heavy-tailed image noise in reconstructed images. In addition, noise in the sinogram domain may lead to non-positive measurements, in particular, when the object being scanned is highly attenuating in nature. However, under-correction of non-positive measurements may lead to bright streaks, while over-correction can cause dark bands to appear in the images. Further, the noise in the sinogram domain that results in the streak and heavy-tailed noise in the reconstructed images may be difficult to reduce utilizing techniques that are applied in the image domain.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment, a computer-implemented method for image processing is provided. The method includes obtaining data acquired by a medical imaging system. The method also includes normalizing the data. The method further includes de-noising the normalized data utilizing a deep learning-based denoising network. The method even further includes de-normalizing the de-noised data. The method yet further includes generating blended data based on both the data and the de-normalized de-noised data.

In accordance with another embodiment, one or more non-transitory computer-readable media are provided. The computer-readable media encode one or more processor-executable routines. The one or more routines, when executed by a processor, cause acts to be performed. The acts include obtaining projection data acquired by a computed tomography (CT) imaging system and normalizing the projection data. The acts also include de-noising the normalized projection data utilizing a deep learning-based denoising network, de-normalizing the de-noised projection data, and generating blended projection data based on both the projection data and the de-normalized de-noised projection data.

In accordance with a further embodiment, a processor-based system is provided. The processor-based system includes a memory structure encoding one or more processor-executable routines. The routines, when executed cause acts to be performed. The acts include obtaining pre-logarithm projection data acquired by a computed tomography (CT) imaging system and normalizing the pre-logarithm projection data to reduce a dynamic range of the pre-logarithm projection data. The acts also include de-noising the normalized projection data utilizing a deep learning-based denoising network, de-normalizing the de-noised projection data, and generating blended projection data based on both the projection data and the de-normalized de-noised projection data. The processor-based system also includes a processing component configured to access and execute the one or more routines encoded by the memory structure.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
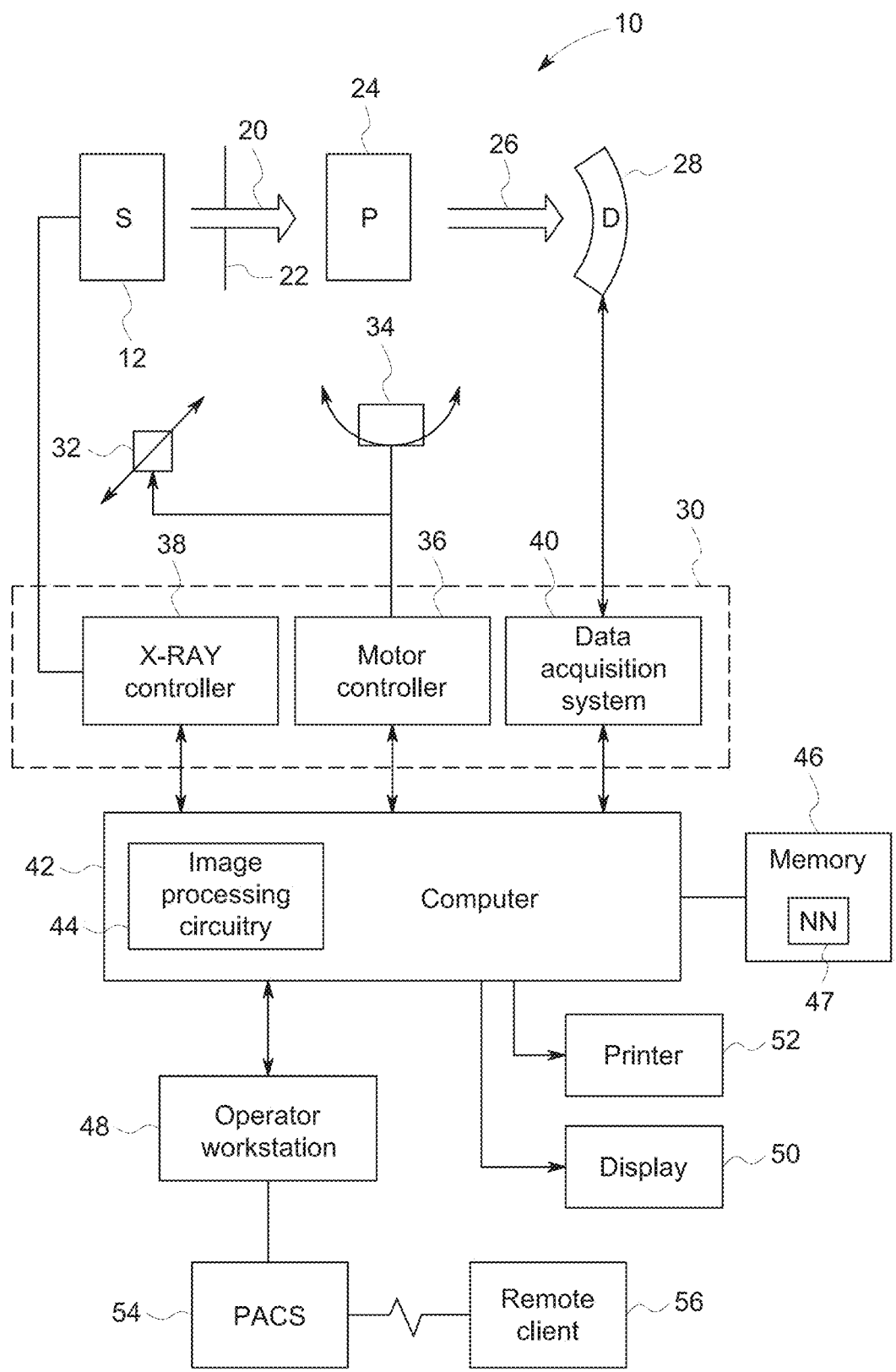
FIG. 1 is a schematic illustration of an embodiment of a computed tomography (CT) system configured to acquire CT images of a patient and process the images, in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion may be provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as imaging (e.g., in industrial use) in non-destructive inspection of manufactured parts or goods (i.e., quality control or quality review applications), and/or the non-invasive inspection of packages, boxes, luggage, and so forth (i.e., security or screening applications), and generally in imaging applications that encounter high dynamic range measurements such as fluorescence microscopy and astronomy imaging.

Deep-learning (DL) approaches discussed herein may be based on artificial neural networks, and may therefore encompass one or more of deep neural networks, fully connected networks, convolutional neural networks (CNNs), perceptrons, encoders-decoders, recurrent networks, u-nets, generative adversarial networks (GANs), or other neural network architectures. The neural networks may include shortcuts, activations, batch-normalization layers, and/or other features. These techniques are referred to herein as deep-learning techniques, though this terminology may also be used specifically in reference to the use of deep neural networks, which is a neural network having a plurality of layers.

As discussed herein, deep-learning techniques (which may also be known as deep machine learning, hierarchical learning, or deep structured learning) are a branch of machine learning techniques that employ mathematical representations of data and artificial neural networks for learning and processing such representations. By way of example, deep-learning approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

Noise in the sinogram domain (e.g., in the projection data of the computed tomography data acquired with a CT scanner) may result in undesirable artifacts in reconstructed images. In addition, noise in the sinogram domain may lead to non-positive measurements (i.e., low signal) due to a scanned object being highly attenuating in nature. However, correction (e.g., under-correction or over-correction) of the non-positive measurements (e.g., before the negative-logarithm step during reconstruction) may lead to bright streaks and/or dark bands in the reconstructed images. Correction of these undesirable artifacts in the reconstructed images is difficult utilizing techniques that are applied to the image domain alone. It is therefore desirable to correct these artifacts utilizing techniques that reduce noise in the sinogram domain. However, reduction of noise in the sinogram domain (in particular, if applied to pre-logarithm projection measurements) may be difficult due to a huge dynamic range resulting from the exponential nature of X-ray attenuation through the object being imaged.

The present disclosure provides for methods and systems to reduce noise and artifacts in images acquired utilizing medical imaging. In particular, data (e.g., projection data (pre-logarithm or post-logarithm) or image data) is obtained that was acquired by a medical imaging system (e.g., CT imaging system, PET imaging system, etc.) and subjected to normalization. The normalized data is then de-noised utilizing a deep learning-based denoising network (e.g., formed of one or more networks). The de-noised data is then de-normalized (e.g., by reversing the mathematical operations utilized in normalization). Blended data is generated based on both the data and the de-normalized de-noised data, which may be utilized in generating a final reconstructed image with fewer artifacts. When applied to projection data, the disclosed techniques provide both low signal correction and general sinogram noise reduction.

With the foregoing discussion in mind, FIG. 1 illustrates an embodiment of an imaging system 10 for acquiring and processing image data in accordance with aspects of the present disclosure. Although the following embodiments are discussed in terms of the computed tomography (CT) imaging system, the embodiments may also be utilized with other imaging systems (e.g., X-ray, PET, CT/PET, SPECT, nuclear CT, magnetic resonance imaging, etc.). In addition, the embodiments may be utilized in any imaging applications that encounter high dynamic range measurements such as fluorescence microscopy and astronomy imaging. In the illustrated embodiment, system 10 is a CT system designed to acquire X-ray projection data, to reconstruct the projection data into a tomographic image, and to process the image data for display and analysis. The CT imaging system 10 includes an X-ray source 12. As discussed in detail herein, the source 12 may include one or more X-ray sources, such as an X-ray tube or solid-state emission structures. The X-ray source 12, in accordance with present embodiments, is configured to emit an X-ray beam 20 at one or more energies. For example, the X-ray source 12 may be configured to switch between relatively low energy polychromatic emission spectra (e.g., at about 80 kVp) and relatively high energy polychromatic emission spectra (e.g., at about 140 kVp). As will be appreciated, the X-ray source 12 may also be operated so as to emit X-rays at more than two different energies, though dual-energy embodiments are discussed herein to simplify explanation. Similarly, the X-ray source 12 may emit at polychromatic spectra localized around energy levels (i.e., kVp ranges) other than those listed herein. Indeed, selection of the respective energy levels for emission may be based, at least in part, on the anatomy being imaged and the chemical or molecules of interest for tissue characterization.

In certain implementations, the source 12 may be positioned proximate to a collimator 22 used to define the size and shape of the one or more X-ray beams 20 that pass into a region in which a subject 24 (e.g., a patient) or object of interest is positioned. The subject 24 attenuates at least a portion of the X-rays. Resulting attenuated X-rays 26 impact a detector array 28 formed by a plurality of detector elements. Each detector element produces an electrical signal that represents the intensity of the X-ray beam incident at the position of the detector element when the beam strikes the detector 28. Electrical signals are acquired and processed to generate one or more scan datasets. The detector array 28 may be part of a detector that operates in an energy-integrating (i.e., readout of the total integrated energy deposited during an acquisition interval) mode or detector that operates in a photon-counting (each individual X-ray photon is detected and its energy characterized) mode.

A system controller 30 commands operation of the imaging system 10 to execute examination and/or calibration protocols and to process the acquired data. With respect to the X-ray source 12, the system controller 30 furnishes power, focal spot location, control signals and so forth, for the X-ray examination sequences. The detector 28 is coupled to the system controller 30, which commands acquisition of the signals generated by the detector 28. In addition, the system controller 30, via a motor controller 36, may control operation of a linear positioning subsystem 32 and/or a rotational subsystem 34 used to move components of the imaging system 10 and/or the subject 24. The system controller 30 may include signal processing circuitry and associated memory circuitry. In such embodiments, the memory circuitry may store programs, routines, and/or encoded algorithms executed by the system controller 30 to operate the imaging system 10, including the X-ray source 12, and to process the data acquired by the detector 28 in accordance with the steps and processes discussed herein. In one embodiment, the system controller 30 may be implemented as all or part of a processor-based system such as a general purpose or application-specific computer system.

The source 12 may be controlled by an X-ray controller 38 contained within the system controller 30. The X-ray controller 38 may be configured to provide power and timing signals to the source 12. In addition, in some embodiments the X-ray controller 38 may be configured to selectively activate the source 12 such that tubes or emitters at different locations within the system 10 may be operated in synchrony with one another or independent of one another. In certain embodiments, the X-ray controller 38 may be configured to provide fast-kVp switching of the X-ray source 12 so as to rapidly switch the source 12 to emit X-rays at the respective polychromatic energy spectra in succession during an image acquisition session. For example, in a dual-energy imaging context, the X-ray controller 38 may operate the X-ray source 12 so that the X-ray source 12 alternately emits X-rays at the two polychromatic energy spectra of interest, such that adjacent projections are acquired at different energies (i.e., a first projection is acquired at high energy, the second projection is acquired at low energy, the third projection is acquired at high energy, and so forth). In one such implementation, the fast-kVp switching operation performed by the X-ray controller 38 yields temporally registered projection data.

The system controller 30 may include a data acquisition system (DAS) 40. The DAS 40 receives data collected by readout electronics of the detector 28, such as sampled analog signals from the detector 28. The DAS 40 may then convert the data to digital signals for subsequent processing by a processor-based system, such as a computer 42. In other embodiments, the detector 28 may convert the sampled analog signals to digital signals prior to transmission to the data acquisition system 40. The computer may include processing circuitry 44 (e.g., image processing circuitry). The computer 42 may include or communicate with one or more non-transitory memory devices 46 that can store data processed by the computer 42, data to be processed by the computer 42, or instructions to be executed by a processor (e.g., processing circuitry 44) of the computer 42. For example, the processing circuitry 44 of the computer 42 may execute one or more sets of instructions stored on the memory 46, which may be a memory of the computer 42, a memory of the processor, firmware, or a similar instantiation. In accordance with present embodiments, the memory 46 stores sets of instructions that, when executed by the processor, perform image processing methods as discussed herein. The memory 46 also stores one or more algorithms and/or neural networks 47 that may be utilized in denoising as described in greater detail below.

The computer 42 may also be adapted to control features enabled by the system controller 30 (i.e., scanning operations and data acquisition), such as in response to commands and scanning parameters provided by an operator via an operator workstation 48. The system 10 may also include a display 50 coupled to the operator workstation 48 that allows the operator to view relevant system data, imaging parameters, raw imaging data, reconstructed data, contrast agent density maps produced in accordance with the present disclosure, and so forth. Additionally, the system 10 may include a printer 52 coupled to the operator workstation 48 and configured to print any desired measurement results. The display 50 and the printer 52 may also be connected to the computer 42 directly or via the operator workstation 48. Further, the operator workstation 48 may include or be coupled to a picture archiving and communications system (PACS) 54. PACS 54 may be coupled to a remote system 56, radiology department information system (RIS), hospital information system (HIS) or to an internal or external network, so that others at different locations can gain access to the image data.

Sinograms are created by arranging the projection data with projection angles arranged along one axis and the spatial dimensions of the projection data arranged along the other axes. Each row of a sinogram constitutes a projection view that is indicative of the attenuation information for a distinct view angle, for given source and detector positions, with respect to a subject or object imaged. Low signal correction (LSC) is an important sinogram processing step utilized to eliminate or reduce non-positive measurements before the negative-log operation. LSC also aims to improve signal-to-noise ratio (SNR) in regions of the sinogram where X-rays have been heavily attenuated. Both these scenarios typically correspond to photon starvation that arise when X-rays are heavily attenuated (due to metal, contrast agent and/or large objects in the X-ray path). The low signal regions may span many consecutive detector elements across many views thus necessitating a DL-based denoising algorithm that can denoise large swathes of the sinogram. However, lack of correction or poor correction may lead to heavy streaks and possibly heavy-tailed noise in the reconstructed image volume. In dual-energy CT (DECT), photon starvation can occur in the low-kV sinogram, while in multiple-energy spectral CT (MECT), it can occur in energy bins that have relatively less signal in energy-integrating detectors or low counts in photon-counting detectors. Material decomposition, which combines DECT or MECT sinograms to obtain material sinograms or images, further worsens the scenario as streaks are bound to spread to all material images from the photon-starved sinograms. Therefore, LSC becomes important for DECT and MECT as well.

Moreover, increased sinogram noise tends to produce undesirable features (e.g., streaks and possibly heavy-tailed noise) in the reconstructed image volume. These undesired artifacts are not easily reduced by image domain denoising algorithms alone, because these artifacts are strongly correlated spatially. For example, streaks are corrected along their direction of orientation and heavy-tailed noise-residue may be interpreted as features-of-interest and may, thus, be preserved by image-domain denoising methods. However, noise in the sinogram domain is spatially uncorrelated and is easier to denoise. DL denoising methods have been demonstrated to outperform state-of-the-art analytical denoising methods. Thus, the following focuses on DL-based LSC and sinogram denoising as a means of improving image quality in single-energy CT (SECT), DECT and MECT.

Application of DL denoising directly to pre-logarithm projection measurements poses a challenge. Pre-logarithm projection measurements have a huge dynamic range due the exponential nature of attenuation of X-rays through objects. Training of DL networks to handle such large dynamic range can lead to numerical difficulties (especially considering that the training process involves highly non-convex optimization) and can lead to sub-optimally trained networks that fall short of their intended goal. Both inter-object (object to object) and intra-object (spatial variation within the object) variation of the dynamic range can cause numerical instabilities during training and application of DL networks for sinogram denoising. A workaround is to partition the huge dynamic range and train multiple networks, one for each partition. However, this approach requires training of multiple networks and does not eliminate the inter-object and intra-object dependencies.

Figure 2A:
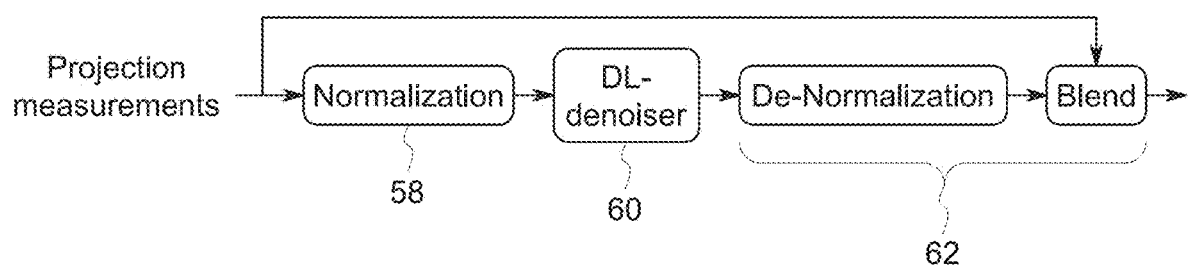
FIGS. 2A and 2B are schematic illustrations of an embodiment of a multi-stage approach for measured data and image processing, respectively, utilizing the disclosed techniques or methods, in accordance with aspects of the present disclosure.
Figure 2B:
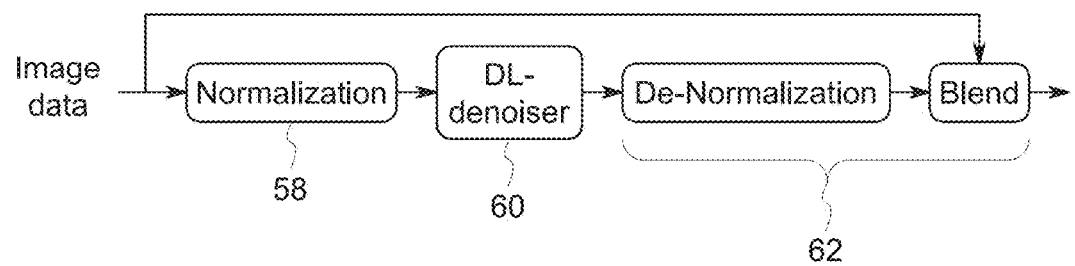

Disclosed herein is a multi-stage approach (e.g., 3-stage approach) to DL-based LSC and sinogram denoising as illustrated in FIG. 2A. The first stage is a pre-processing stage 58 that normalizes the projection measurements and compresses the dynamic range irrespective of the object being studied. The second stage is the actual DL LSC and denoising stage 60 where a DL network takes the normalized projection measurements and outputs a denoised version. The final stage 62 undoes the normalization (via de-normalization) and adaptively combines the denoised output with the original measurements to reduce any resolution loss that may occur as a result of denoising. In certain embodiments, the projection measurements may be pre-logarithm projection measurements. In other embodiments, the projection measurements may be post-logarithm projection measurements. In certain embodiments, the multi-stage approach may be applied to image data as depicted in FIG. 2B. In particular, the image data may be normalized, denoised via a DL network, denormalized, and then the denormalized denoised image data may be adaptively combined with the original image data.

The individual stages of the multi-stage approach are described in greater detail below with pre-logarithm projection measurements from CT utilized as an example. Similar approaches may be taken with post-logarithm projection measurements and image data.

Normalization

Noise in pre-logarithm projection measurements can be fairly accurately modeled as Poisson in photon-counting detectors or approximately modeled as a Poisson-Gaussian mixture in energy-integrating detectors. Both models result in spatially varying levels of noise, with low signal regions having poorer SNR compared to high signal regions. Therefore, it is preferable that the normalization highlights or focuses on the noise in poor SNR regions.

Noting that low-frequency components of pre-logarithm projection measurements mainly contribute to their dynamic range, as part of the normalization, the described techniques focus on separating the low-frequency components from the measurements. The low-frequency components may be separated from the measurement in a couple of different ways: (i) by subtracting the low-frequency components from the measurements to yield only high-frequency components or (ii) by obtaining a ratio of the measurements to the low-frequency components. Option (i) highlights both noise and edges in the entire sinogram, while option (ii) increases noise at low SNR regions and subdues noise at high SNR regions naturally highlighting the noisy regions for DL to denoise. Based on these two observations, the following normalization strategy is provided.

Let P denote the projection measurements. Then, the normalization process involves first obtaining a preliminary noise-reduced version, $P_d$, of P by applying off-the-shelf algorithms (e.g., a simple smoothing-filter or in a more sophisticated case, a bilateral-like filter). Care is taken to ensure that $P_d$ is positive, i.e., $P_d>0$. Then, the normalized projection, $P_n$, is obtained as $$P_n = \frac{P - g(P)}{f(P_d)}, \quad (1)$$

where g is a function that produces a noise-reduced version of P (e.g., via low-pass filtering or conventional denoising), and f is a positive monotonic function. Monotonicity of f is preferable for the above ratio to maintain edge-information in the normalized projection, $P_n$, that is consistent with the edge-information in the measured projection P. The normalization strategy in equation (1) captures both options (i) and (ii) discussed above for the respective special cases when $f(P_d)=1$ (i.e., do not divide by $f(P_d)$) and when $g(P)=0$, respectively. Note that $g(P)$ and $P_d$ can be two different noise-reduced versions of P.

Figure 3A:
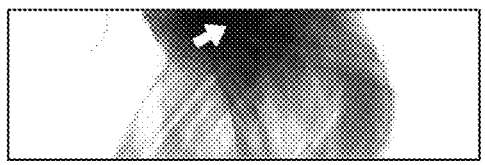
FIGS. 3A-3F illustrate a portion of a sinogram of a patient corresponding to one detector row under a variety of conditions, in accordance with aspects of the present disclosure.
Figure 3B:
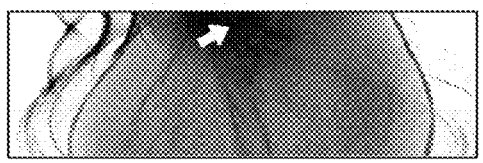
Figure 3C:
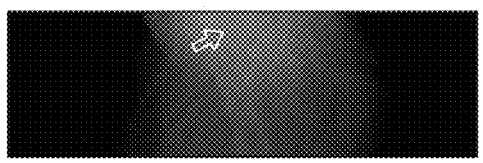
Figure 3D:
Figure 3E:
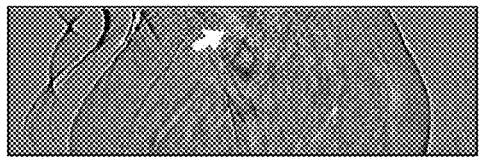
Figure 3F:
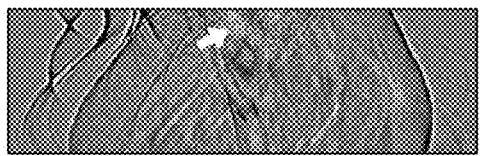

FIGS. 3A-3F illustrate a portion of a sinogram of a patient corresponding to one detector row under of a variety of conditions. FIG. 3A illustrates a pre-logarithm projection measurements of the sinogram having a dynamic range between $-6\times10^3$ and $7\times10^6$ counts. Due to this huge dynamic range only a portion of the sinogram is shown. FIG. 3B illustrates an estimated SNR in the pre-logarithm projection measurements with a dynamic range of −8 to 51 decibels (dB). FIG. 3C illustrates an air-scan normalized, clipped post-logarithm projection data with a dynamic range between 0 and 13 dB. This range is still high enough that only a portion of the sinogram can be displayed while trying to highlight low signal regions. FIG. 3D illustrates a high-pass component, P−g(P), of the pre-logarithm projection measurements with a dynamic range between $-2.5\times10^6$ and $2.5\times10^6$ counts. Due to this huge dynamic range, it is difficult to uniformly highlight noise in the whole sinogram. FIG. 3E illustrates one version of the disclosed normalized sinogram derived utilizing $P/f(P_d)$ with a dynamic range of −0.6 to 3.6. FIG. 3F is another version of the disclosed normalized sinogram derived utilizing equation (1) with a dynamic range between −2 and 2.5.

The effect of the disclosed normalization strategy in equation (1) can be compared with the cases only looking at the high-frequency component and the standard approach of taking the logarithm to compress dynamic range. The disclosed normalization strategy in equation (1) compresses the dynamic range and acts as a noise-level indicator by highlighting regions of high noise. This is because in low signal regions, the magnitude of the denominator in equation (1) is low, which thus highlights noise in low SNR regions. In contrast, the high SNR regions in the normalized sinograms in FIGS. 3E and 3F have lower noise. Thus, equation (1) essentially acts as an indicator of the noise-level of the pre-logarithm projection measurements.

In addition, the proposed normalization strategy in equation (1) may be utilized as an edge indicator to highlight edges by designing $P_d$ and $f$ so that the denominator in equation (1) behaves slightly different than the numerator around edges. For example, if $P_d$ a smoothed version of P, then equation (1) will naturally highlight edges as illustrated in FIGS. 3E and 3F. If $P_d$ is an edge-preserving denoiser, then edges in the normalized output will be subdued since those edges will have already been captured by $P_d$.

The solid arrow in FIGS. 3A and 3B indicate low signal regions and low SNR regions, respectively. The noise present in these low signal regions is not apparent (as indicated by the hollow arrow) in the post-logarithm projection data in FIG. 3C even though the dynamic range is compressed. In addition, the edge details are not as enhanced in FIG. 3C compared to FIGS. 3E and 3F (which correspond to the disclosed normalization schemes). Even though the high-pass component in FIG. 3D highlights edges, the dynamic range is still huge and the noise in the low signal region (as indicated by the hollow arrow) is not apparent. The disclosed normalization schemes utilized in FIGS. 3E and 3F compress the dynamic range, highlight edges, and brings out noise in the low signals regions (as indicated by the solid arrows). The function g was implemented as a 11×11 boxcar smoothing filter and $f(P_d)=P_d$, where $P_d$ was obtained by smoothing P with a 15×15 boxcar filter. The difference between FIGS. 3E and 3F is minimal with FIG. 3F highlighting the edges slightly more but the noise being of similar levels in FIGS. 3E and 3F.

Noise may be modulated via $f$. In the simplest case of identity mapping, $f(P_d)=P_d$, with $P_d>0$, and ignoring $g(P)$ in equation (1), resulting in $P_n=P/P_d$, which yields a normalized sinogram (such as in FIG. 3E), $P_n$, that is approximately in the range [1−ε, 1+ε], where ε<1, when $P_d>>0$, irrespective of the object being imaged. However, noise in the low signal regions in the normalized sinogram can further be modulated by choosing how the function $f(x)$ behaves for x→0. Obviously, care should be taken so that $f(x)$ does not become close to zero to avoid noise-blowup in low-signal regions. $f$ can be designed such that $f(x)\in[a, b]$ for x→0, where 0<a<b and $f(x)\approx x$ elsewhere, while choosing a and b to ensure that the ratio in equation (1) stays within certain acceptable limits in the low signal regions. For instance, it can be designated that $$f(x) = \frac{a + x^2}{1 + x}$$

so that for x→0, $f(x)\to a$ and for x>>0, $f(x)\to x$.

In summary, normalization compresses the dynamic range, while highlighting noisy regions and edges in the projections to make it feasible for a DL-network to preserve edges during denoising. With the disclosed normalization it is therefore feasible to denoise entire projection measurements, independent of the object being scanned, using a DL network.

DL-Denoising

Any type of DL denoising network, such those available from image denoising literature, can then be employed for DL denoising in the proposed framework. The normalized projection is fed as input and the output of the DL-network is a denoised version of the normalized projection. Difference-based loss functions can be utilized to train the DL network such as, $$\sum_i h\left(\left|DL\{P_n^{i,train}\} - P_n^{i,label}\right|\right), \quad (2)$$

where h is a non-negative monotonic function, $P_n^{i,train}$ the ith two-dimensional (2D) or three-dimensional (3D) training patch of noisy normalized projection data input to the DL network, $DL\{P_n^{i,train}\}$ is the output of the network, and $P_n^{i,label}$ the corresponding normalized ground-truth label of projection data. In certain embodiments, additional loss terms may be included in equation (2) that drive the DL network to train to preserve (a) projection features and (b) local mean. The former improves denoising performance, while the latter reduces any bias due to denoising.

Post-Processing

The denoised version of the normalized sinogram, which is output from the DL-denoiser, undergoes a de-normalization step where the normalization is undone by basically reversing the mathematical operations involved in the normalization step in equation (1), that is, the de-normalized denoised projection is given by $$P_{denoised} = f(P_d) \times P_n^{denoised} + g(P)$$

where $P_n^{denoised}$ is the denoised normalized projection output from the DL denoiser in the second stage. While DL-denoising has the potential to reduce sinogram noise, it is still possible that sinogram entries corresponding to some fine image features may be filtered out. Because sinogram domain operations potentially impact the whole reconstructed image volume due to backprojection, it is crucial to preserve useful information from the original projection measurements. This is achieved by adaptively combining the denoised sinogram with the original measured projections, that is, the final adaptively combined output is given by $$P_{final} = w(P, P_{denoised}) \times P_{denoised} + (1 - w(P, P_{denoised})) \times P \quad (4).$$

or more generally:

$$P_{final} = f(P, P_{denoised}) \quad (4).$$

where F( ) may be a non-linear function of P and $P_{denoised}$, such as but not limited to another deep learning network.

The adaptivity or weights can be based on estimated SNR (e.g., similar to that in FIG. 3B) of the measured projections. In such a case, w(P, $P_{denoised}$) is small for high SNR regions or high signal strengths so that the original measurements can be trusted more and, thus, contribute more to the final output $P_{final}$ in equation (4). Alternatively, the weights can be based on an estimate of the noise level in the original measurements P, in which case, w(P, $P_{denoised}$) will be high when noise in P is high so that more trust is given to the denoised version $P_{denoised}$ and make it contribute more to the final output $P_{final}$.

Figure 4A:
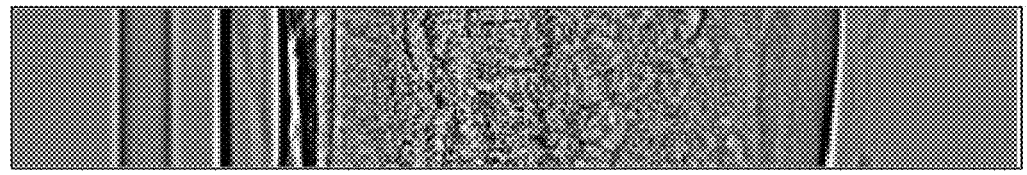
FIGS. 4A-4C illustrate a normalized noisy measured projection, DL-denoised normalized projection, and a denoised and adaptively combined output (shown in a normalized domain), respectively, in accordance with aspects of the present disclosure.
Figure 4B:
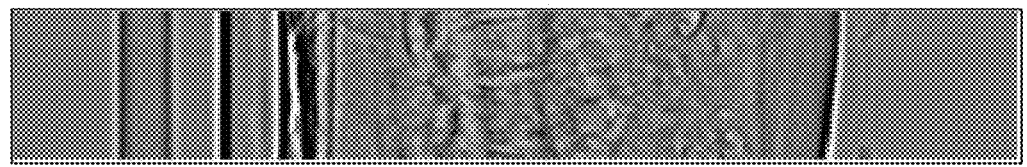
Figure 4C:
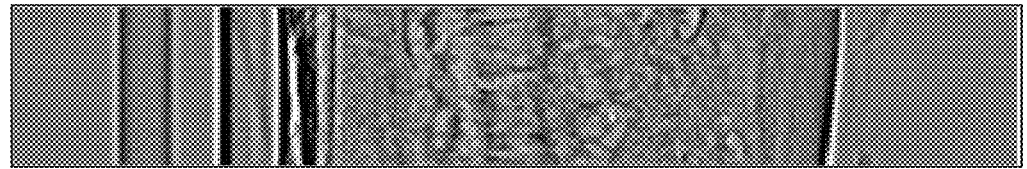

FIGS. 4A-4C illustrate a normalized noisy measured projection, DL-denoised normalized projection, and a denoised and adaptively combined output (shown in a normalized domain), respectively. In particular, FIG. 4B illustrates the output of the DL-denoiser. The DL-output in FIG. 4B has reduced noise but appears to be slightly smudged; however, after going through stage 3 (de-normalization and adaptive combination) appears in FIG. 4C to have more detail than the denoised output in FIG. 4B but at the same time has less noise compared to the undenoised projection in FIG. 4A. For FIG. 4C, w(P, $P_d$) was computed based on the signal strength in $P_{denoised}$.

As mentioned above, the techniques described above for SECT may also apply to DECT and MECT as follows.

Normalization

In DECT and MECT, there are measurements corresponding to different spectral energy ranges or energy bins, so that measurements corresponding to some energy ranges or bins have better SNR compared to others. Therefore, it is proposed to use high-SNR measurements for normalization. For instance, the high-kV projections in DECT are usually less noisy than the low-kV ones. Thus, it is better to trust $P^{high}$ for normalization and to perform a preliminary denoising of the high-kV projection $P^{high}$ to get $P_d^{high}$ and use that to normalize both the low-kV and high-kV projections, $P^{low}$ and $P^{high}$ respectively, using equation (1), to get respective normalized projections as $$P_n^{low} = \frac{P^{low} - g(P^{low})}{f(P_d^{high})} \text{ and}$$

$$P_n^{high} = \frac{P^{high} - g(P^{high})}{f(P_d^{high})},$$

respectively. Similarly, in MECT, the normalization can be done by computing the preliminary denoised version, $P_d^{n,MECT}$, corresponding to measurements from the nth energy-bin with the highest recorded signal (either in terms of signal-energy or in terms of photon count) or $P_d^{Total,MECT}$, corresponding to the total measured counts and use that to normalize measurements from all energy-bins using equation (1).

DL-Denoising

In DECT and MECT, it is proposed to feed the normalized dual-energy or normalized multi-energy projections corresponding to the two or multiple respective energy bins jointly as input channels to the DL-network similar to joint denoising of color images with multiple color channels. The motivation is that there is spatially correlated and spectrally complementary information in the projections corresponding to the two energies in DECT or multiple energy bins of MECT that can aid the denoising of measurements corresponding to all energies or energy bins. Denoising DECT and MECT projection data may be denoised utilizing techniques described in U.S. patent application Ser. No. 16/505, 870, entitled "System and Method for Processing Data Acquired Utilizing Multi-Energy Computed Tomography Imaging" by Ramani et al., which is hereby incorporated by reference in its entirety.

Post-Processing

The de-normalization step for DECT and MECT are straightforward operations similar to that in equation (3). For the adaptive combining step for DECT, the weights w(P, $P_{denoised}^{high}$) can be computed based on the denoised high-kV projections because the original high-kV measurements, $P^{high}$, have higher SNR and, thus, $P_{denoised}^{high}$ will have relatively better denoised-quality than the corresponding low-kV denoised projections $P_{denoised}^{low}$. Similarly, in MECT, the weights w(P, $P_{denoised}^{n,MECT}$) may be computed and utilized, where $P_{denoised}^{n,MECT}$ is the DL denoised version of MECT measurements $P^{n,MECT}$ corresponding to that energy bin n that had the highest SNR or photon counts to begin with, or in the case where total measured counts is used w(P, $P_{denoised}^{Total,MECT}$) may be computed and utilized. The computed weights, or w(P,$P_{denoised}^{high}$) and w(P, $P_{denoised}^{n,MECT}$) or w(P, $P_{denoised}^{Total,MECT}$), respectively, will be used for adaptively combining low and high-kV projections in DECT and projections from all energy bins in MECT. This will ensure that the projections in DECT and MECT are treated in a spatially consistently manner during the adaptive combining step, which is important to avoid streaks and azimuthal blur in the resulting reconstructed DECT and MECT images.

Additionally, the proposed multi-stage approach may also be applied to post-logarithm measurements, that is, where the input to the normalization stage and the denoised denormalized blended output in FIG. 2A are in the logarithm-domain. Taking the logarithm naturally linearizes the pre-logarithm measurements, which may make it easier to design the normalization and DL denoisers in the proposed multi-stage approach. Moreover, one or more additional transforms that compress the dynamic range or adjust the histogram of the measurements (such as the logarithm, power function, inverse tangent function), can be applied to the input to the normalization stage, making the transformed measurements more suitable for further processing by the DL network. These additional transforms may be un-done during the de-normalization step.

Additionally, a mean-preserving correction step may be included as part of the blending stage to ensure that the final denoised denormalized blended data exhibit local mean characteristics similar to the measured data. This mean-preserving correction can be implemented using simple image-processing filters that operate on the difference between the measured data and the denoised denormalized blended data. Preserving the local mean is essential to avoid low-frequency bias shifts in the final reconstructed images which otherwise may affect quantitative accuracy of the final reconstructed images.

Although the above techniques were discussed with regard to emission tomography data, it may also be utilized on magnetic resonance imaging data or any data acquired in image applications that encounter high dynamic range measurements such as fluorescence microscopy and astronomy imaging.

Figure 5:
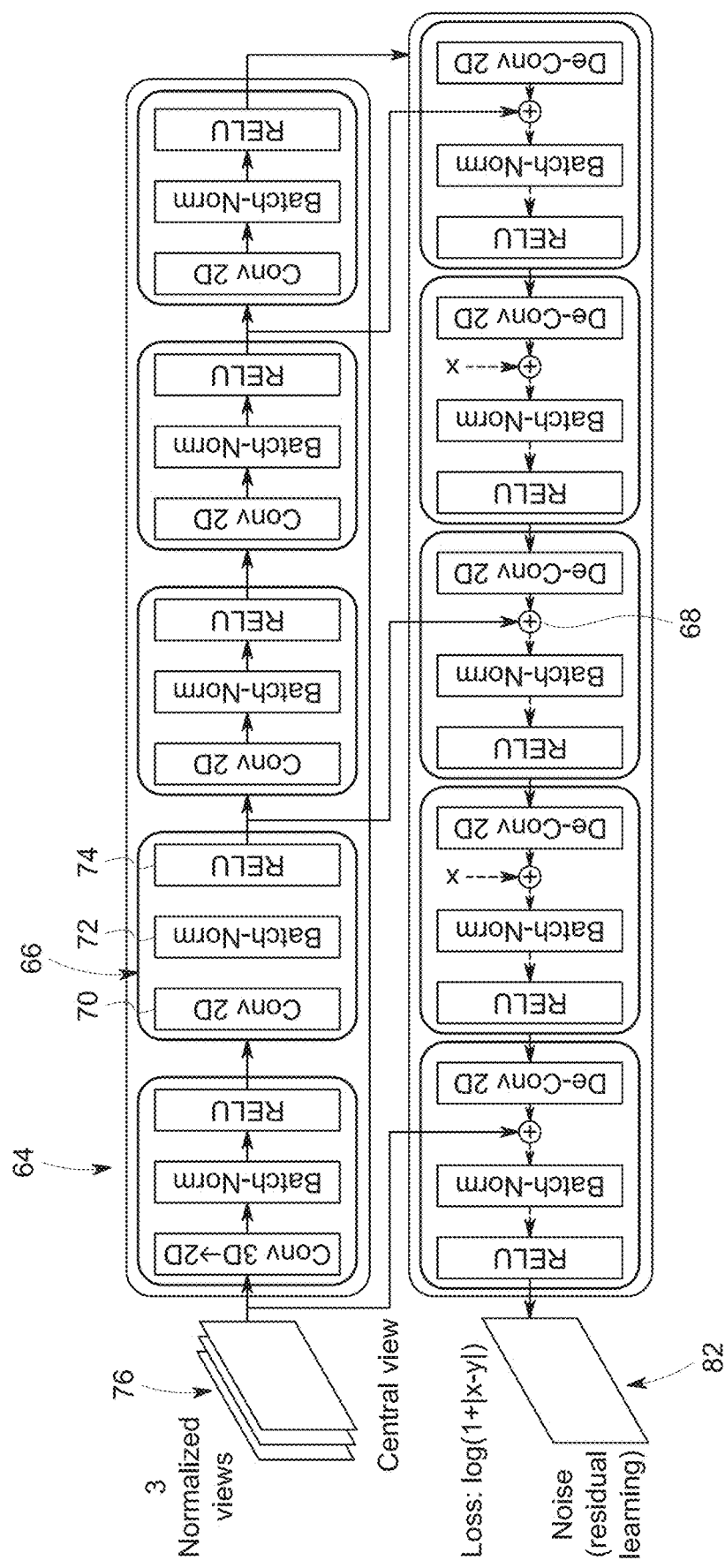
FIG. 5 illustrates a schematic diagram of an embodiment of an encoder-decoder DL network for denoising, in accordance with aspects of the present disclosure.

FIG. 5 illustrates a schematic diagram of an encoder-decoder DL network 64 for denoising. As depicted, the encoder-decoder DL network 64 includes a plurality of stages 66 and a plurality of skip connections 68 for bypassing certain stages 66. Each stage 66 may include different types of convolutional layers 70 (e.g., 2D or 3D to 2D convolutional layers), batch normalization layers 72, and/or activation layers 74(e.g., rectified liner unit (ReLU) layers) 74.

Figure 6A:
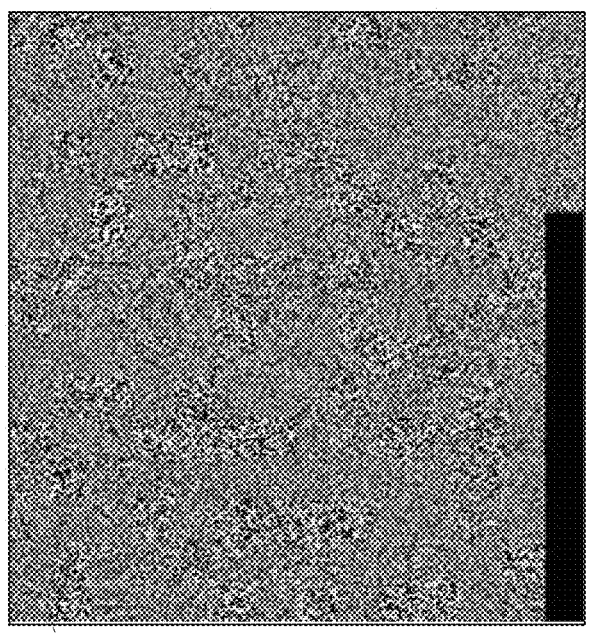
FIGS. 6A and 6B illustrate training samples for the encoder-decoder DL network of FIG. 5, in accordance with aspects of the present disclosure.
Figure 6B:
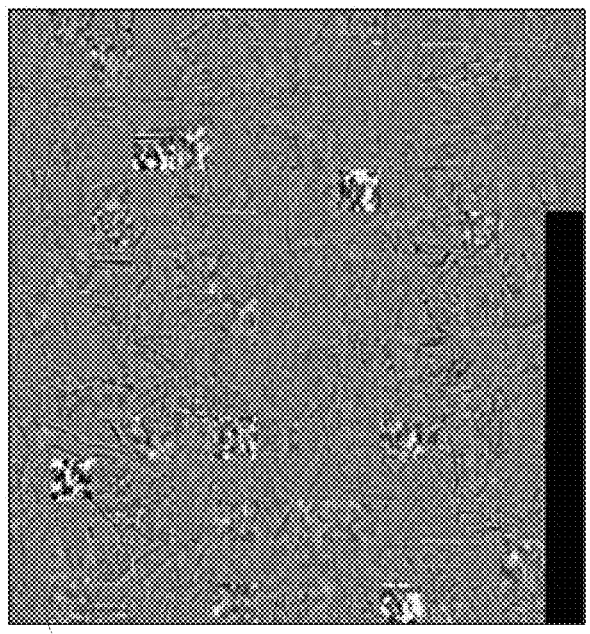

The network 64 was utilized to demonstrate the techniques described above by simulating noisy 3D projection data and corresponding training "ground-truth" laves based on nearly noise-free projection data obtained by averaging 100 scans of a subject (e.g., turkey meat from the butcher). The normalized version of the noisy projections obtained as $P_n=P/P_d$ were provided as input 76 to the network 64, where Pa was obtained by smoothing P using a 11×11 boxcar filter. For every denoised projection view to be estimated, three views (including the view to be denoised) were fed into the network 64. FIGS. 6A and 6B illustrate training samples provided to the network 64. FIG. 6A depicts a stack of central slices of 41×41×3-sized 3D blocks of noisy training samples 78 (i.e., projection data) and FIG. 6B depicts the corresponding noise-free ground truth labels 80. The edges in normalized ground-truth labels 80 are visible. The training samples were obtained using an average of the projection data of the subject. The training was carried out to output from the network 64 residual noise 82 in the noisy training input (via residual learning).

Figure 7:
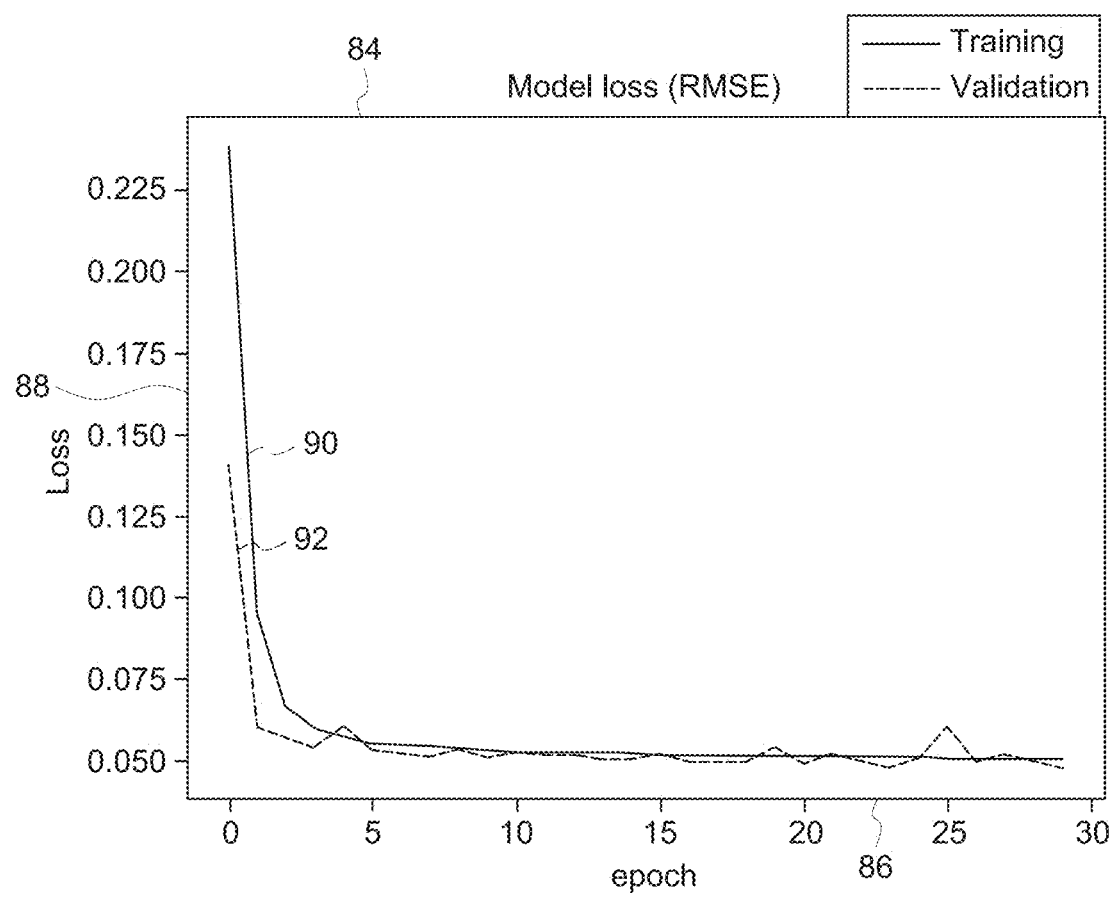
FIG. 7 illustrates a representation of a graph for illustrating training and validation loss over epochs utilizing the encoder-decoder DL network in FIG. 5, in accordance with aspects of the present disclosure.

The loss function was chosen to be $\log(1+|DL_{output}-Label|)$ to address the presence of heavy-tailed noise in the normalized training samples. The evolution of the training and validation loss over epochs is illustrated in FIG. 7. FIG. 7 includes a representation of a graph 84 having an x-axis 86 for loss (in root mean square error (RMSE)) and a y-axis 88 for number of epochs. Plot 90 (shown as solid) represents the training loss and plot 92 (shown as a dashed) represents the validation loss. As depicted in FIG. 7, the reduction of the validation loss over the epochs indicate that the network 64 has trained without overfitting the training data. For the post-processing stage, the DL-denoised output and the original projections were combined using a simple linear combination with weights w(P) decided by the signal strength in the original measurements P.

Figure 8A:
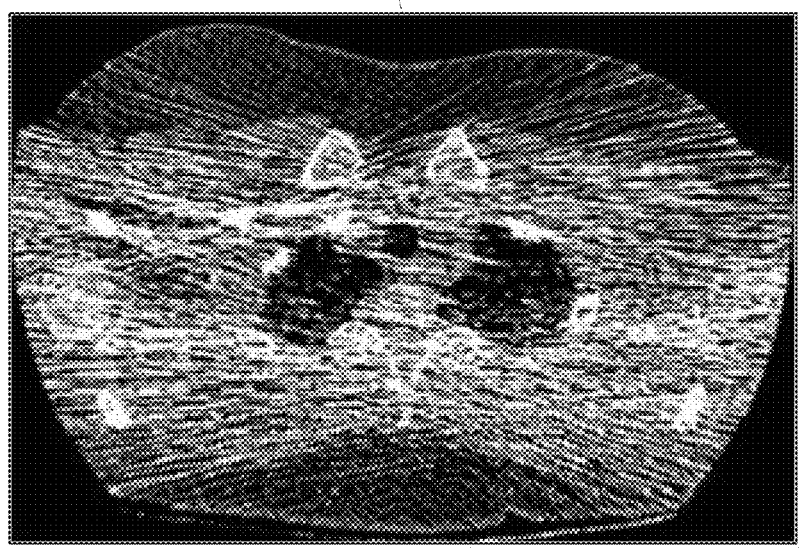
FIGS. 8A and 8B illustrate axial reconstructed axial images of a shoulder region of a subject, in accordance with aspects of the present disclosure.
Figure 8B:
Figure 9A:
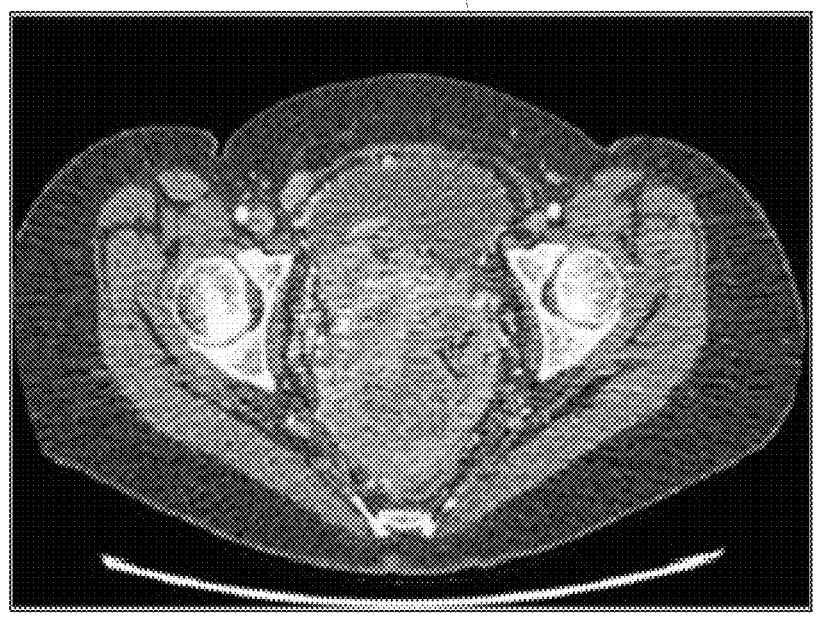
FIGS. 9A and 9B illustrate axial reconstructed CT images of a pelvic region of a subject, in accordance with aspects of the present disclosure.
Figure 9B:
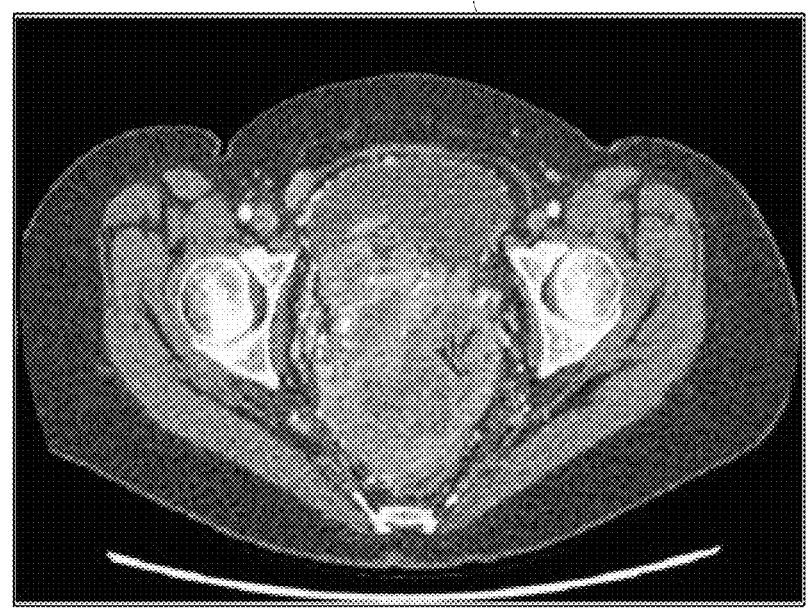
Figure 10A:
FIGS. 10A and 10B illustrate reconstructed coronal images of an abdominal region of a subject, in accordance with aspects of the present disclosure.
Figure 10B:

FIGS. 8-10 illustrate the efficacy of the proposed DL-based LSC and sinogram denoising method. FIGS. 8A and 8B depict reconstructed axial images 94, 96 of a shoulder region of a subject. Image 94 was reconstructed without the proposed DL-based method for LSC, while image 96 was reconstructed with the proposed DL-based method for LSC. As depicted in comparing FIGS. 8A and 8B, the strong streaks due to heavy attenuation in the shoulder region (in presence of some contrast agent) are greatly reduced illustrating the LSC-capability of the proposed method. FIGS. 9A and 9B depict reconstructed axial images 98, 100 of a pelvic region of a subject. Image 98 was reconstructed without the proposed DL-based sinogram denoising method, while image 100 was reconstructed with the proposed DL-based sinogram denoising method. FIGS. 10A and 10B depict reconstructed coronal images 102, 104 of an abdominal region of a subject. Image 102 was reconstructed without the proposed DL-based sinogram denoising method, while image 104 was reconstructed with the proposed DL-based sinogram denoising method. Sinogram denoising using the proposed method reduces streaks in the axial plane in the pelvic region (as shown in comparing FIGS. 9A and 9B) and also reduces noise throughout the whole volume (as shown in comparing FIGS. 10A and 10B).

Technical effects of the disclosed embodiments include providing a three-stage approach for reducing a dynamic range of data (e.g., projection data or image data) to enable deep learning based denoising and/or low signal correction. In particular, data may be normalized to enable a trained deep learning network to denoise the normalized data. The denoised data may then be denormalized and utilized to generate artifact-free and noise-free images with an image texture preferred by practitioners.

This written description uses examples to disclose the present subject matter, including the best mode, and also to enable any person skilled in the art to practice the present approaches, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for image processing, comprising:
    obtaining data acquired by a medical imaging system;
    normalizing the data;
    de-noising the normalized data utilizing a deep learning-based denoising network;
    de-normalizing the de-noised data; and
    generating blended data based on both the data and the de-normalized de-noised data.

2. The computer-implemented method of claim 1, comprising generating a final reconstructed image from the blended data.

3. The computer-implemented method of claim 1, wherein the data comprises image data.

4. The computer-implemented method of claim 1, wherein the data comprises emission tomography data and magnetic resonance imaging data.

5. The computer-implemented method of claim 1, wherein the data comprises X-ray data.

6. The computer-implemented method of claim 5, wherein the X-ray data comprises computed tomography (CT) scan data from single-energy CT, dual-energy CT, or multi-energy spectral CT.

7. The computer-implemented method of claim 1, wherein the X-ray data comprises projection data.

8. The computer-implemented method of claim 7, wherein normalizing the data comprises normalizing post-logarithm projection data.

9. The computer-implemented method of claim 7, wherein normalizing the data comprises normalizing pre-logarithm projection data to reduce a dynamic range of the pre-logarithm projection data.

10. The computer-implemented method of claim 1, wherein generating blended data based on both the data and the de-normalized de-noised data comprises applying weights to the data and the de-normalized de-noised data to determine a respective contribution of the data and the de-normalized de-noised data to the blended data.

11. The computer-implemented method of claim 10, wherein applying the weights to the data and the de-normalized de-noised data is based on an estimated signal-to-noise ratio of the data, an estimated noise level of the data, or a signal strength in the de-normalized de-noised data.

12. The computer-implemented method of claim 1, wherein generating blended data based on both the data and the de-normalized de-noised data additionally comprises a filtering operation to keep the local mean in the de-normalized de-noised blended data the same as that in the measured data.

13. The computer-implemented method of claim 1, wherein normalizing the data comprises generating and utilizing a noise-reduced version of the data to obtain the normalized data.

14. One or more non-transitory computer-readable media encoding one or more processor-executable routines, wherein the one or more routines, when executed by a processor, cause acts to be performed comprising:
    obtaining projection data acquired by a computed tomography (CT) imaging system;
    normalizing the projection data;
    de-noising the normalized projection data utilizing a deep learning-based denoising network;
    de-normalizing the de-noised projection data; and
    generating blended projection data based on both the projection data and the de-normalized de-noised projection data.

15. The one or more non-transitory computer-readable media of claim 14, wherein the one or more routines, when executed by a processor, cause acts to be performed comprising generating a final reconstructed image from the blended data.

16. The one or more non-transitory computer-readable media of claim 14, wherein normalizing the data comprises normalizing post-logarithm projection data.

17. The one or more non-transitory computer-readable media of claim 14, wherein normalizing the data comprises normalizing pre-logarithm projection data to reduce a dynamic range of the pre-logarithm projection data.

18. The one or more non-transitory computer-readable media of claim 14, wherein generating blended projection data based on both the projection data and the de-normalized de-noised projection data comprises applying weights to the projection data and the de-normalized de-noised projection data to determine a respective contribution of the projection data and the de-normalized de-noised projection data to the blended projection data.

19. The one or more non-transitory computer-readable media of claim 14, wherein generating blended projection data based on both the projection data and the de-normalized de-noised projection data additionally comprises a filtering operation to keep the local mean in the de-normalized de-noised blended data the same as that in the measured data.

20. A processor-based system, comprising:
    a memory structure encoding one or more processor-executable routines, wherein the routines, when executed cause acts to be performed comprising:
    obtaining pre-logarithm projection data acquired by a computed tomography (CT) imaging system;
    normalizing the pre-logarithm projection data to reduce a dynamic range of the pre-logarithm projection data;
    de-noising the normalized projection data utilizing a deep learning-based denoising network;
    de-normalizing the de-noised projection data; and
    generating blended projection data based on both the pre-logarithm projection data and the de-normalized de-noised projection data; and
    a processing component configured to access and execute the one or more routines encoded by the memory structure.

* * * * *